No. 897,828. PATENTED SEPT. 1, 1908.
O. A. HALL.
RAIL FASTENER.
APPLICATION FILED NOV. 14, 1907.
8 SHEETS—SHEET 2.
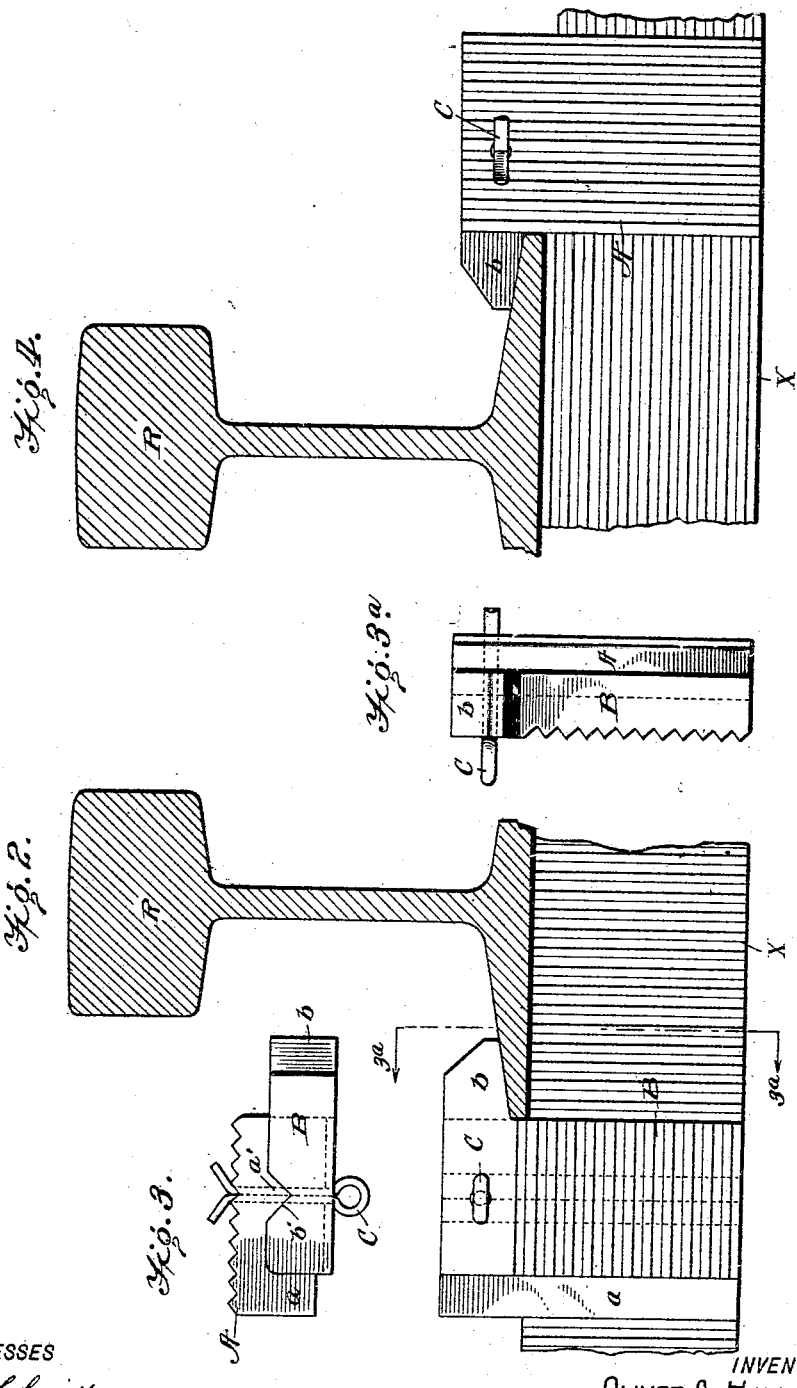
WITNESSES
L. H. Schmidt,
Edw. W. Byrn.
INVENTOR
OLIVER A. HALL,
BY Munn & Co.
ATTORNEYS

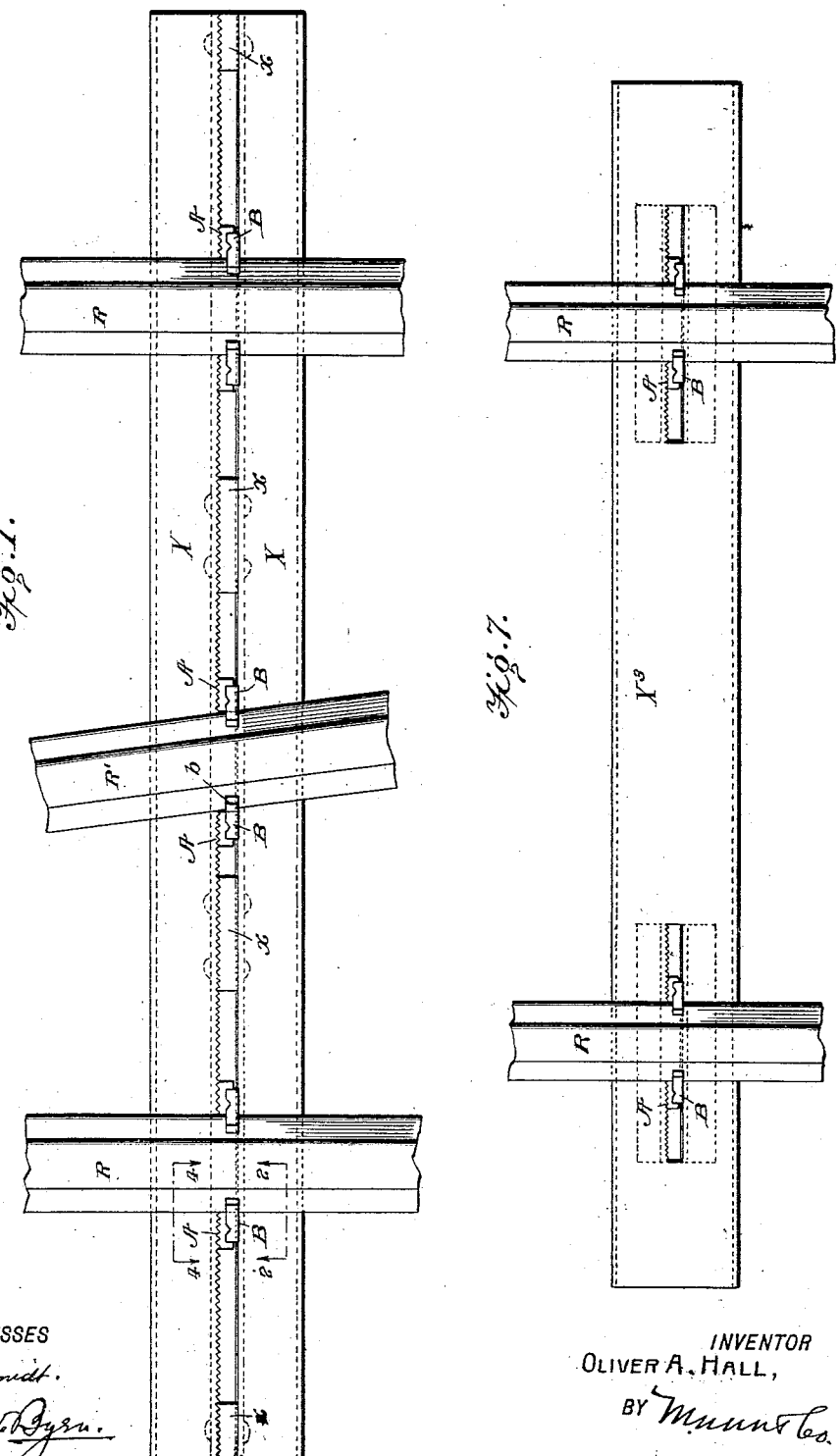

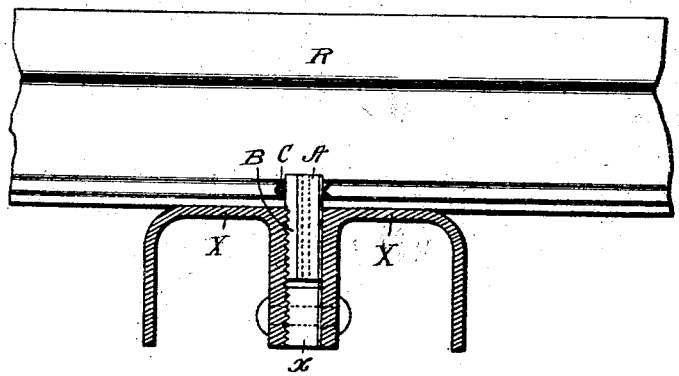
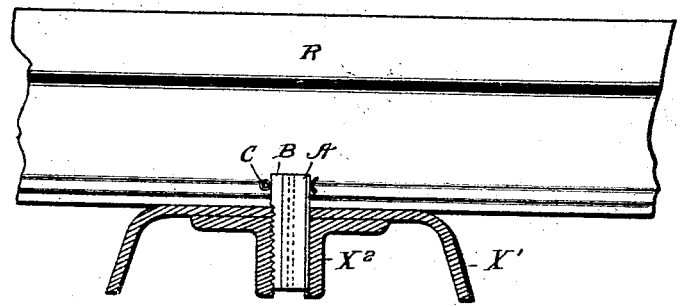
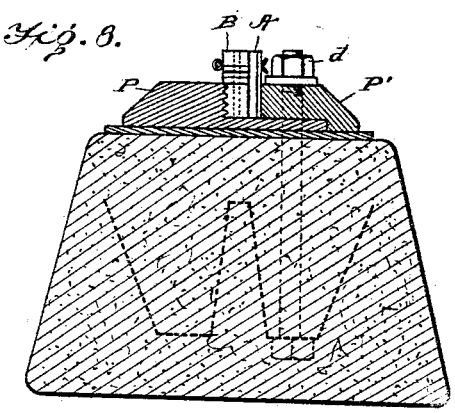
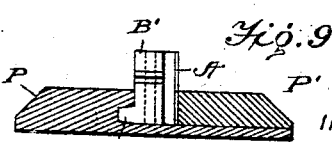

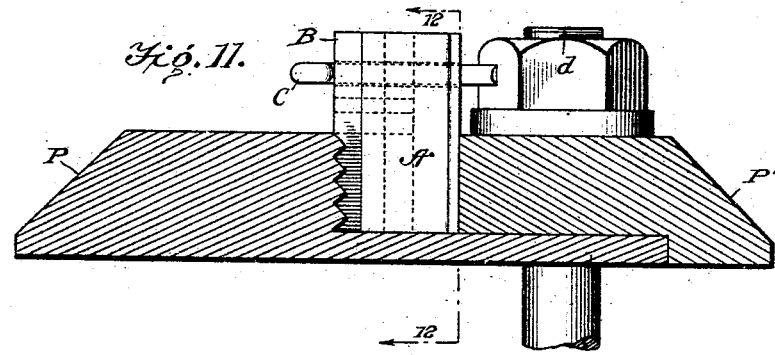
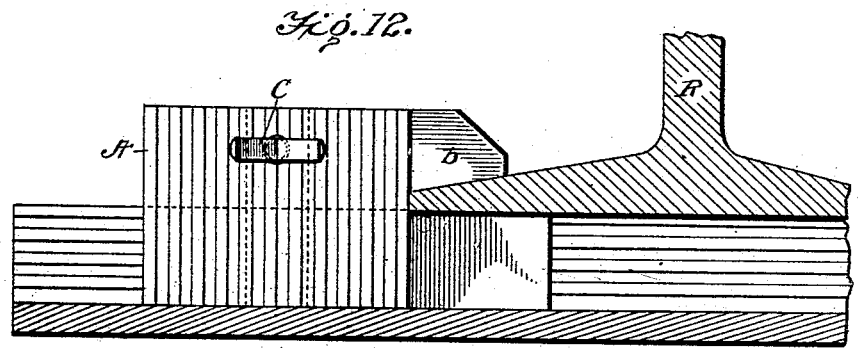
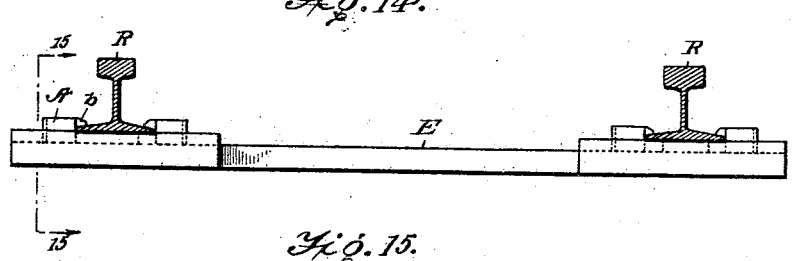
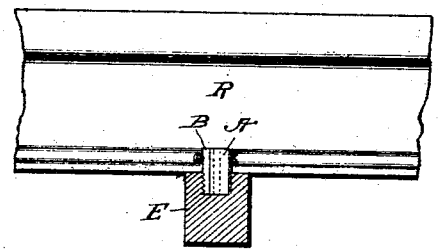

No. 897,828. PATENTED SEPT. 1, 1908.
O. A. HALL.
RAIL FASTENER.
APPLICATION FILED NOV. 14, 1907.
8 SHEETS—SHEET 5.
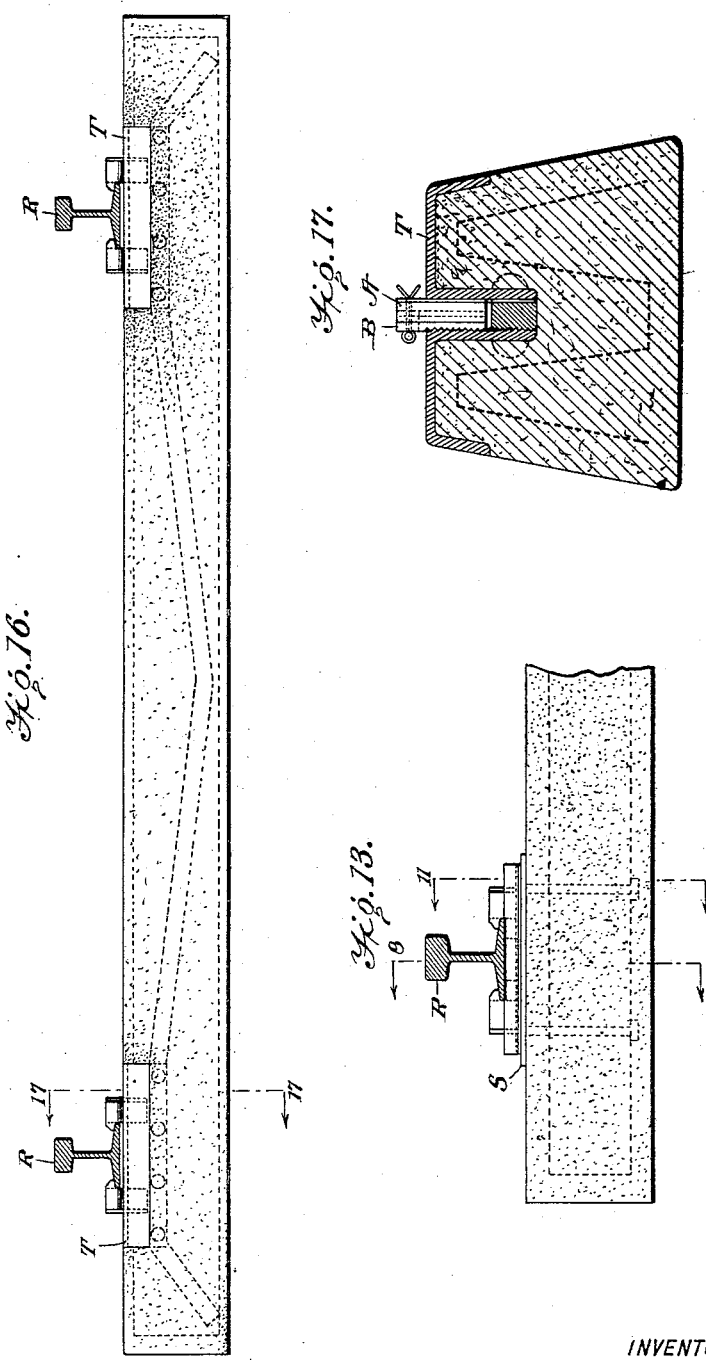
WITNESSES
L. H. Schmidt.
Edw. W. Byrn.
INVENTOR
OLIVER A. HALL,
BY Munn & Co.
ATTORNEYS No. 897,828. PATENTED SEPT. 1, 1908.
O. A. HALL.
RAIL FASTENER.
APPLICATION FILED NOV. 14, 1907.
8 SHEETS—SHEET 6.
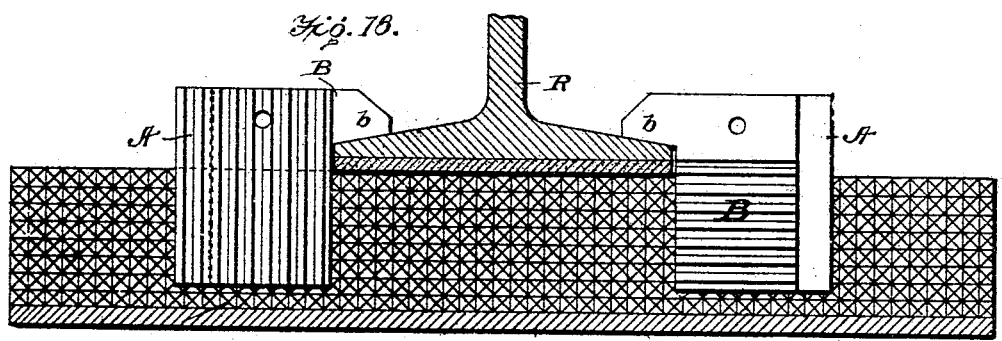
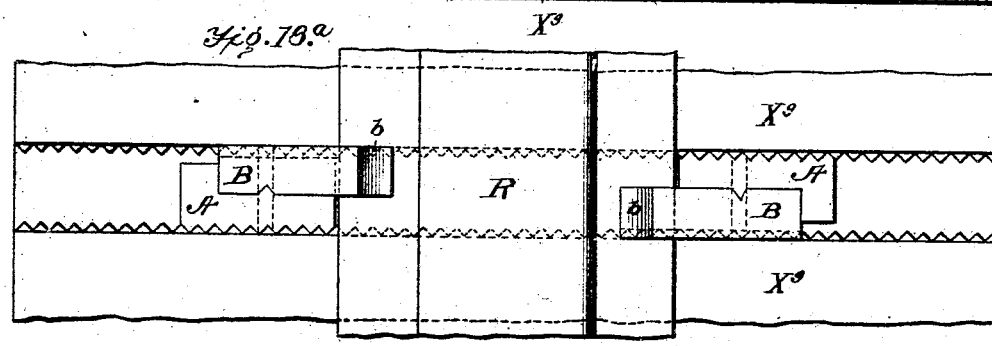
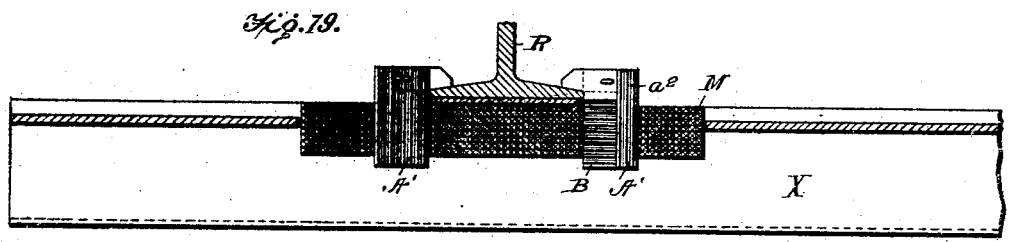
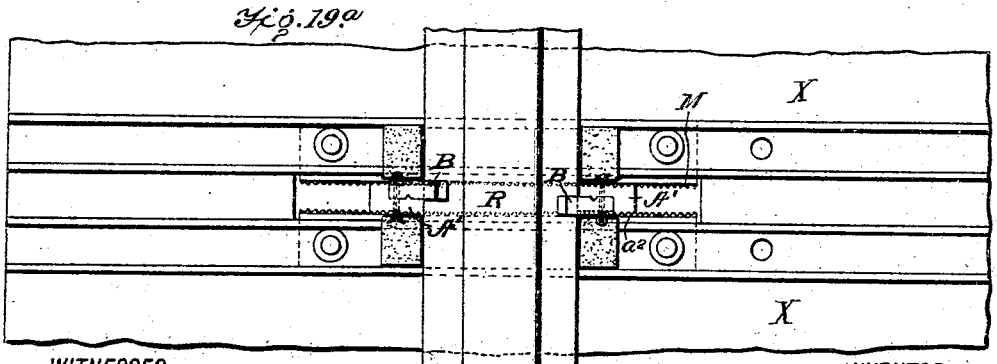
WITNESSES
Samuel E. Wade.
Edw. W. Byrn.
INVENTOR
OLIVER A. HALL,
BY Munn & Co.
ATTORNEYS

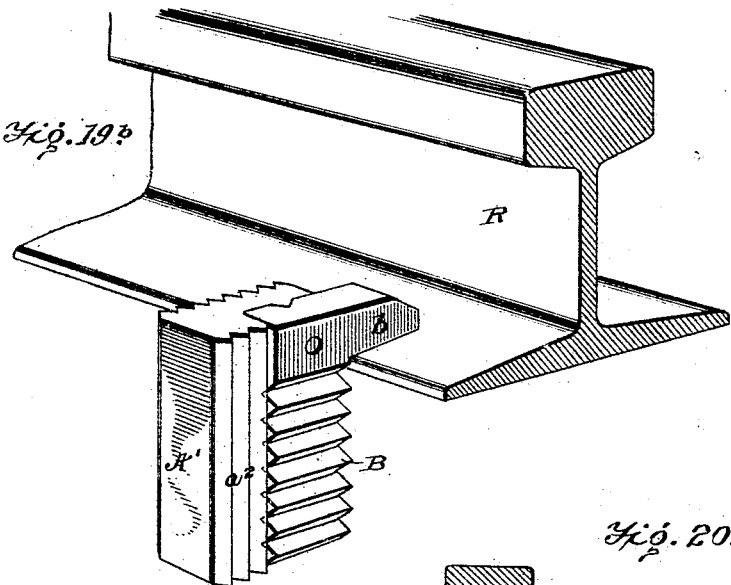
Fig. 19ᵇ
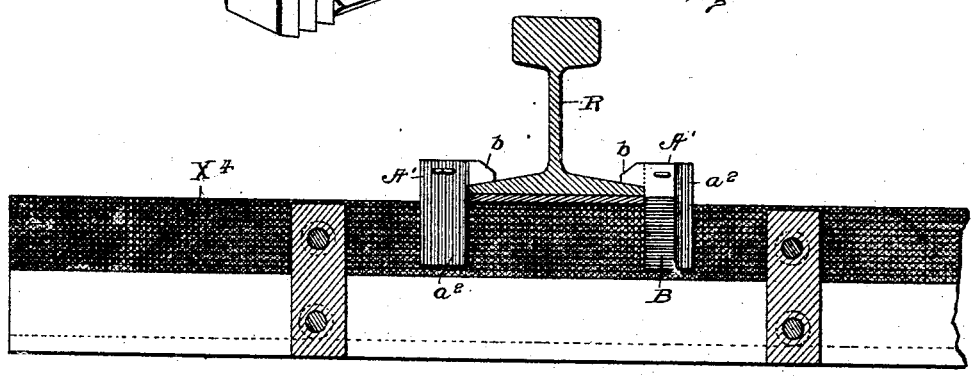
Fig. 20.
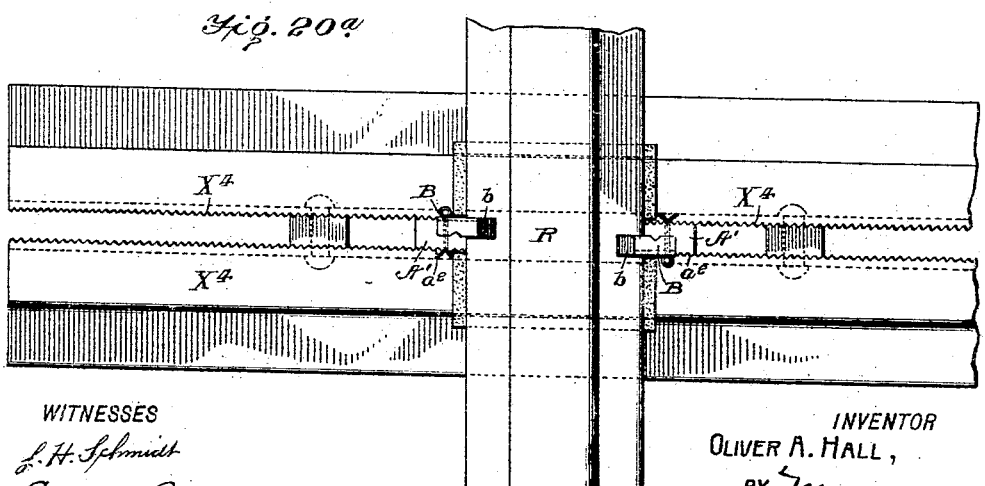
Fig. 20ᵃ
INVENTOR
OLIVER A. HALL,

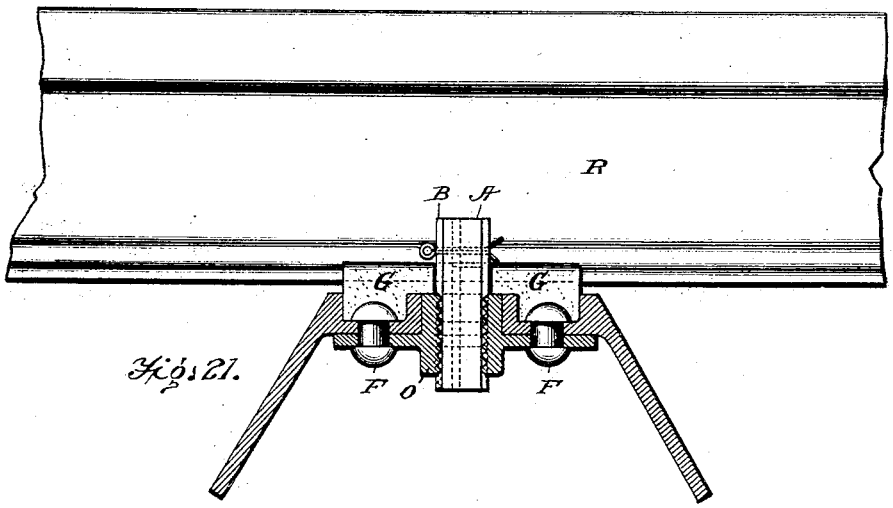
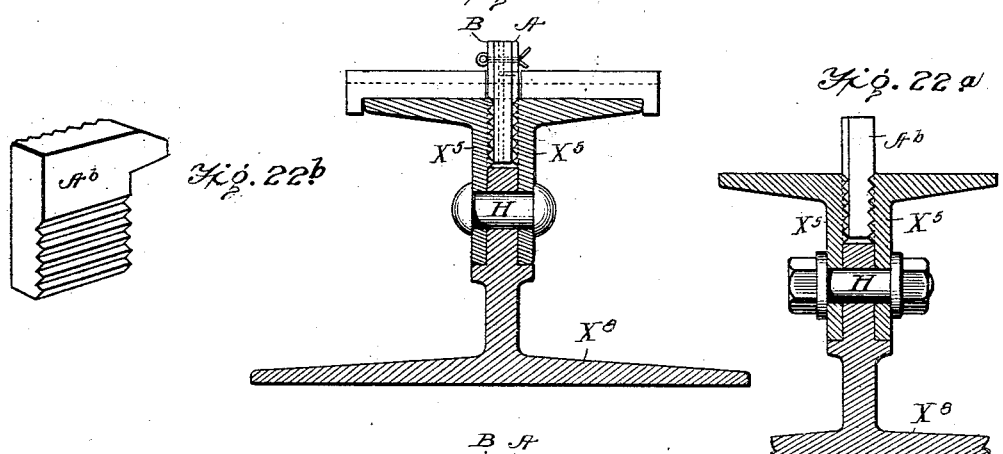
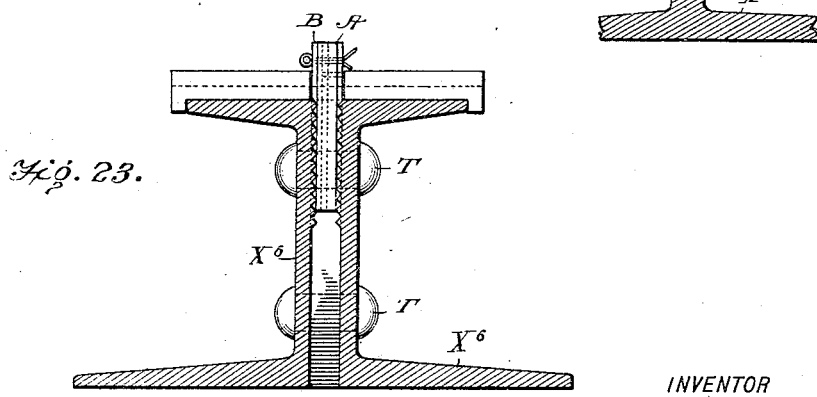

UNITED STATES PATENT OFFICE.

OLIVER A. HALL, OF OMAHA, NEBRASKA.

RAIL-FASTENER.

No. 897,828.　　　Specification of Letters Patent.　　　Patented Sept. 1, 1908.

Application filed November 14, 1907. Serial No. 402,173.

*To all whom it may concern:*

Be it known that I, OLIVER A. HALL, a citizen of the United States, and a resident of Omaha, in the county of Douglas and State of Nebraska, have invented certain new and useful Improvements in Rail-Fasteners, of which the following is a specification.

The object of my invention is to provide a permanent means of fastening, clamping and locking a railroad rail in alinement with or to a tie or roadbed without the necessity of injuring or defacing the tie or roadbed and to provide for adjustment for different widths of rail bases and widths of gage without defacing or injuring the tie or roadbed or the necessity of providing new ties or bars whenever the rail sizes or widths of track gages are changed; also to allow the use of any form of tie or roadbed desired, such as concrete, composition, metal, wood, etc., which can be set permanently in place and the rails renewed or changed as to sizes as often or whenever desired.

To these ends my invention consists in either the compound or one-piece form of fastener as hereinafter claimed, and in the combination of the same with a special form of rail support, as hereinafter more fully described with reference to the drawings, in which Figure 1 is a plan view showing my invention applied to a metal tie. Fig. 2 is an enlarged side elevation viewed on the line 2—2 of Fig. 1 and showing the fastener applied to the rail. Fig. 3 is a top plan view of the compound form of fastener. Fig. 3ª is an elevation in edge view of the fastener taken on the line 3ª—3ª of Fig. 2 and looking in the direction of the arrows. Fig. 4 is an elevation of the fastener on the line 4—4 of Fig. 1 and looking in the opposite direction to Fig. 2. Figs. 5 and 6 are cross sections through different forms of metal ties showing modifications of the invention. Fig. 7 is a top plan view showing another application of my invention to a metal tie. Fig. 8 is a cross section through a concrete or composition tie taken on the line 8—8 of Fig. 13, and showing another form of my invention. Fig. 9 is a sectional view showing another form of my invention applied to a rail supporting plate. Fig. 10 is a further modification showing another form of rail supporting plate. Fig. 11 is an enlarged cross-section showing on a larger scale the rail supporting plate P, P'. Fig. 12 is a vertical section taken on the line 12—12 of Fig. 11. Fig. 13 is a view taken in a plane longitudinally to the tie and transversely to the rail and showing the application of a rail-supporting plate on the top of the composite or concrete tie. Fig. 14 is a view taken in a plane longitudinally to the tie and transversely to the rails showing the application of my invention as an alinement bar for switches, etc. Fig. 15 is a sectional view taken on the line 15—15 of Fig. 14, and slightly enlarged. Fig. 16 is a view of the concrete or composition tie taken in a plane at right-angles to the rails, showing a form of my invention applied to the same. Fig. 17 is a transverse section of the tie and plate taken on the line 17—17 of Fig. 16. Figs. 18 and 18ª are a sectional side elevation and top plan view, respectively, of another form of my invention. Figs. 19, 19ª, 19ᵇ, are, respectively, longitudinal section of tie, top plan view and perspective of still another form of my invention. Figs. 20 and 20ª are, respectively, a longitudinal section of tie, and plan of another form. Figs. 21, 22, and 23 are transverse sections of metal ties of still other modified forms. Fig. 22ª is a cross section of the same form of tie shown in Fig. 22, but with a one-piece rail clamp Aᵇ applied to the same, instead of a compound rail clamp, and Fig. 22ᵇ is a detail in perspective showing the one-piece rail clamp.

Referring to Fig. 1, R and R are the two running rails and R' the cross-over or switch rail laid on the tie, as formed of the two metal sections X and X. As shown these two metal sections are spaced apart by means of metal filling blocks x which are riveted, bolted or otherwise fastened between the two sections of the tie, so as to leave between the said tie sections a longitudinal opening or slot running as desired substantially the full length or only in portions of the length of the tie. Within the longitudinal slot of the tie are arranged any number of my compound rail clamps consisting each of the two sections A and B; or where the clamp is desired, made of only one piece, as hereinafter described and claimed, the two metal sections of the tie X and X would be bolted or otherwise adjustably fastened together. The inner vertical faces of the slot of the tie are deformed or fashioned into clutch faces so as to securely engage the corresponding faces of the two sections of my rail clamp, or the two faces of the one-piece rail clamp. The faces of this slot and also of the outside faces of the rail clamp may be either corrugated, serrated or saw-tooth or otherwise deformed horizontally, vertically or at any angle, and the two sections of the clamp are keyed, perforated or otherwise deformed into clutch faces, so as to easily engage each other when slipped into position and be firmly locked so as to not be removable by any pull up or lifting strain or side shearing strain which may be exerted against it by the action of the rail under a load. As shown, the clutch faces on one side of the slot are in the nature of vertical and parallel corrugations, serrations, saw-toothing or other deformations and the clutch faces on the other side of said slot are horizontal, parallel corrugations, serrations, saw-toothing or other deformations.

The section A of my compound clamp is formed on its external wall, Figs. 1 to 4, with vertical corrugations, serrations, saw-toothing or other deformations meshing or interlocking with the vertical corrugations, serrations, saw-toothing or other deformations of the tie on one side of the slot, and the other section B of my compound clamp has its external wall fashioned into horizontal corrugations, serrations, saw-toothing or other deformations meshing and interlocking with the horizontal corrugations, serrations, saw-toothing or other deformations of the other side of the tie slot. The section B of the clamp is provided with an overhanging lip or lug $b$, which bears upon the upper surface of the base of the rail and holds the same down to the tie. The other section A of the clamp is provided with or without, as desired, a rectangular flange $a$, see Fig. 3, which extends behind the outer end of the clamp section B. The two clamp sections A and B are formed on their adjacent faces with interlocking means consisting of the rib or other deformation $a'$ on the section A and the corresponding groove or other interlocking deformation $b'$ in the section B which when interlocked prevent the horizontal separation of the two sections; or the groove or other interlocking deformation $b'$ may be on the section A, and the rib or other deformation $a'$ may be on the section B, or vice versa as may be desired. The two sections A and B are also locked against vertical movement away from each other by means of a horizontal perforation and a cotter key, rivet, bolt or other means of fastening C.

As will be seen in Fig. 1, the clamp section B having the horizontal corrugations on its outer face is adjusted to the rail base with the corrugations, serrations, saw-toothing or other deformations of the section B interlocked with the horizontal corrugations, serrations, saw-toothing or other deformations on one side of the slot of the tie and the other clamp section A is then by vertical movement slipped down between the section B and the opposite side of the tie slot, so that the vertical corrugations, serrations, saw-toothing or other deformations of the section A mesh with the vertical corrugations, serrations or other clutch deformations on one side of the slot while the interlocking rib or other deformation $a'$ enters the vertical groove or interlocking deformation $b'$ of the other section. This clutch connection prevents the horizontal separation of the sections A and B and when the cotter key, rivet, bolt or other means of fastening C is passed through the sections A and B it will be seen that the section A is also locked against vertical movement, so that the compound clamp A, B is rigidly fixed in place as against displacing strains in all directions. It will also be seen that as the corrugations, serrations, saw-toothing or other clutch deformations in the sides of the slot are co-extensive with the length of the tie slot, the compound clamp A, B may be inserted at any point along the length of said slot to adapt it to the varying widths of the rail bases or to the position of the switch rail, or to the variations of the gage of the running rails.

In Figs. 5 and 6, I have shown how my invention is applicable to two different forms of metal or composition ties, the metal or composition tie in Fig. 5 may be either of integral or composite construction with a longitudinal channel way, while in Fig. 6 the metal tie may be formed in two pieces with the slot and its clutch faces formed in a subjacent T shape bar, $X^2$, or the same may be of channel bar construction with angle bars set on its face bearing the clutch faces.

In Fig. 7, I show a top plan view of a metal tie with my locking and clamping devices in such position of the tie only as may be subject to variations due to possible adjustments in the widths of rail bases, but the width of the gage would not be materially altered. In such case the slot is not co-extensive with the length of the tie $X^3$, but only extends a short distance on each side of the rails.

In Fig. 8 I have shown a form of my invention in which a concrete or composition tie serves to support a special form of plate on which the rail is carried and which plate is fashioned to receive my rail clamp A, B. Said rail plate in this case may be made of two sections P and P' fitted together with a longitudinal rabbet joint as shown, or said rail-plate may be of only one piece and the two adjacent faces of the slot in the same provided respectively, with vertical and horizontal corrugations, serrations, saw-toothing or other clutch deformations which mesh and interlock with the clutch faces of the clamp. Bolts or other means of fastening $d$ pass through the two sections of the plate, or the one section as the case may be and anchor the same to the subjacent concrete or composite or other structure.

In Fig. 9 substantially the same plate as shown in Fig. 8 is employed, but one of the members of my rail clamp is formed with a laterally projecting lug $l$ at its lower end which enters a recess in one of the plate sections P so as to firmly lock the clamp against upward movement. In Fig. 10, I show a rail bearing plate, or commonly called tie-plate, for a rail somewhat similar to that employed in Figs. 8 and 9 and having its upper surface formed with depressions.

Fig. 11 shows, in enlarged cross-section taken on the line 11—11 of Fig. 13, the two-part base plate for the rail, and Fig. 12 is one form of section taken on the line 12—12 of Fig. 11 showing the manner of holding down the rail base to the base plate by the overlapping of my compound clamp; Fig. 13 shows the side view of the concrete or composition railway tie showing the application thereto of my invention as set forth in detail in Figs. 11 and 12 and showing also an elastic cushion S which may be inserted between the plate and the concrete or composition tie.

In Figs. 14 and 15 a transverse alinement bar E is shown as employed in place of a tie to which my invention is shown applied for holding the rails in alinement for use at switches, or at such points where use of such bar is found desirable.

In Figs. 16 and 17 a reinforced concrete or composition tie is provided with my invention applied to the same by means of the saddles T. Fig. 17 may be modified in many other different forms. The clutch faces forming the slot may be merely bars running longitudinally through the length or portions of the length of the tie, and the rail made to bear directly on the tie; or the same may be made and applied as shown in the drawings by means of the saddles T either overlapping the edges of the tie as shown or merely lapping over and lying on the top of the tie.

In Figs. 18 and 18$^a$, the two members A and B of my compound clamp are constructed in a manner similar to that already described but the adjacent faces, or opposite faces of the slot in the basic support $X^2$ are formed exactly alike; that is to say, instead of having the faces of said slot with vertical corrugations on the one side and horizontal corrugations, serrations, saw-toothing or other clutch deformations on the other side of the slot, the corrugations on both sides of the slot are both vertical and horizontal, resolving the adjacent or opposite faces of the slot into a surface of symmetrical clutch projections which engage alike with the vertical corrugations of the section A and the horizontal corrugations of the section B. Or the faces of the clamp may have the symmetrical clutch projections and the faces of the slot have the horizontal and vertical corrugations opposite each other, or vice versa as desired.

In Figs. 19, 19$^a$, and 19$^b$ the vertically insertible member A' is provided with vertical corrugations, serrations, saw-toothing or other clutch deformations on both of its sides, the vertical corrugations on one side extending throughout the entire face of said member which comes in contact with face of the slot and the vertical corrugations on the other side shown at $a^2$ being formed on that portion of the member A' which extends behind the coöperating member B. In this form of the device it will be seen that the vertically insertible member A' has an interlocking clutch connection with both of the clutch faces on the opposite sides of the slot.

In Figs. 20 and 20$^a$ the same arrangement of clutch faces and clamp members is employed as in Figs. 19 and 19$^a$ except that in the latter figures the clutch faces of the slot are formed in independent plates M bolted, riveted or otherwise fastened to the two parts of the metal tie X, while in Figs. 20 and 20$^a$ clutch faces are formed directly on the inner surfaces of the tie sections $X^4$.

In Fig. 21 which shows a form of metallic tie with a subjacent plate O applied to the same and containing the clutch faces, the plate and the tie are fastened together by rivets, bolts or other means of fastening F, and which may if desired also secure cushions G to the metal tie. The elastic cushions G may be used or left off entirely and the rail made to bear directly on the tie if so desired.

In Fig. 22, a different form of metallic tie is shown composed of a T-bar $X^3$ and two angle bars, or other bars, $X^5$ and $X^5$, bolted, riveted or otherwise fastened to the web of of the T-bar and to each other by bolt, rivet or other fastening H, the clutch faces being formed on the inner surfaces of the said bars.

In the one-piece form of my rail clamp, shown at $A^b$ in Fig. 22$^a$ and 22$^b$, the two angle bars $X^5$ and $X^5$ are bolted or otherwise adjustably fastened to the web of the T-bar $X^3$ so as to allow the clutch faces on the inner faces or surfaces of the angle bars to be drawn up tight and locked and intermeshed against the corresponding sides of the one-piece rail clamp, and the rail clamp is adjusted to the rail base by loosening these bolts H or other means of adjustable fastening.

In Fig. 23, the tie is formed of two channel irons $X^6$ and $X^6$ connected by bolts, rivets or other fastening T, the clutch faces being formed on the inner faces of the channel bars.

In making use of my invention I wish to have it understood that I do not confine this application to the fastening of the rails to ties or roadbeds, but my invention is designed to cover its use for any other analogous purposes such as alinement bars for holding the rails in position where the same are subject to being moved, such as switch fastenings, attaching crane rails to crane girders, attaching members to I-beams, rolled or other shapes.

In making use of my invention I wish to have it further understood that whereas the drawings show clutch deformations running longitudinally and vertically only, I do not confine this application to clutch deformations running in these directions alone, but said clutch deformations may be made to run in any direction found desirable or at any angle.

In making use of my invention, I wish to have it further understood that whereas these drawings accompanying these specifications show the clamping device made up in two pieces, or compound in form, I do not confine this application to this form alone, but wish it understood that said clamping device may be made of one piece only, and that adjustment of the same may be made by opening and closing the slot faces by means of bolts or other adjustable fastenings, as hereinbefore described and set forth.

I am aware that two-part locking devices have been applied to the securing of railroad rails to their subjacent bed, and do not claim this broadly.

By means of my invention a permanent railroad tie or roadbed may be employed and any width of base or flange of rail may be used and the gage maintained, or the gage itself may be changed if desired and the devices and ties be used repeatedly and for any length of time without the necessity of renewal.

I claim:

1. A rail fastening, consisting of a rail supporting member having a slot running transversely to the rail with the adjacent vertical faces of said slot wrought into clutch formations and a rail clamp with corresponding clutch formations fitting between and interlocking with both of said opposite clutch formations of the rail supporting member.

2. A rail fastening, consisting of a rail supporting member having a slot running transversely to the rail with the adjacent vertical faces of said slot wrought into clutch formations, and a compound rail clamp made in two parts, each having on its exterior side clutch formations corresponding to the clutch formations of the adjacent side of the supporting member, said compound rail clamp being provided with interlocking means and fitting between and interlocking with both of said opposite clutch formations of the rail supporting member.

3. A rail fastening, consisting of a rail supporting member having a slot running transversely to the rail with the adjacent vertical faces of said slot wrought into clutch formations, and a two-part rail clamp, one part being formed with clutch formations of a horizontal character meshing with the corresponding clutch formations of the adjacent rail supporting member and the other part of the rail clamp being formed with vertical clutch formations meshing with the clutch formations of its adjacent rail supporting members, and means for connecting the two parts of the rail clamp together.

4. A rail fastening, consisting of a rail supporting member having a slot running transversely to the rail with the adjacent vertical faces of said slot wrought into clutch formations having both a vertical and a horizontal locking direction, and a rail clamp having on its opposite sides clutch formations fitting between and interlocking with the clutch formations of both the rail supporting members.

5. A rail fastening, consisting of a rail supporting member having a slot running transversely to the rail with the adjacent vertical faces of said slot wrought into clutch formations, said rail supporting member being also divided into two parts with one overlapping the other with a rabbeted joint, and a rail clamp with clutch formations fitting between and interlocking with both of said opposite clutch formations of the rail supporting member.

6. A rail fastening, consisting of a rail supporting member having a slot running transversely to the rail with the adjacent vertical faces of said slot wrought into clutch formations, said rail supporting member being also divided into two parts with one overlapping the other with a rabbeted joint, and a rail clamp with clutch formations fitting between and interlocking with both of said opposite clutch formations of the rail supporting member, and a composite base arranged beneath the rail supporting member.

7. A rail fastening, comprising a rail support having an opening running transversely to the rail with clutch formations on both the opposite faces of the said opening, and a compound rail-clamp composed of two members, one of the same having an external clutch face slidable in one direction into the clutch faces of one side of the opening and locking in the other direction, and the other member having clutch faces slidable into the clutch faces of the other side of the opening by a movement at right angles to the sliding movement of the other member, one of said members having an overhanging lug for overlapping the rail base.

8. A rail fastening, comprising a rail support having an opening running transversely to the rail with clutch formations on both the opposite faces of the said opening, and a compound rail clamp composed of two members, one of the same having an external clutch face slidable in one direction into the clutch faces of one side of the opening and locking in the other direction, and the other member having clutch faces slidable into the clutch faces of the other side of the opening by a movement at right angles to the sliding movement of the other member, one of the said members having an overhanging lug for overlapping the rail base, and means for locking the two members of the compound clamp against separation from each other.

9. A rail fastening, comprising a rail support having an opening running transversely to the rail with clutch formations on both the opposite sides or faces of the said opening, and a compound rail clamp composed of two members, one of the same having an external clutch face slidable in one direction into the clutch faces of one side of the opening and locking in the other direction, and the other member having clutch faces slidable into the clutch faces of the other side of the opening by a movement at right angles to the sliding movement of the other member, one of the said members having an overhanging lug for overlapping the rail base, means for locking the two members of the compound clamp against separation from each other in horizontal direction, and means for locking them against separation in vertical direction.

10. A rail fastening comprising a two-part rail clamp, combined with a rail support slotted transversely to the rail and having clutch faces on both the inner sides of the slot, the two parts of the rail clamp having clutch faces interlocking with both the clutch faces of the slot and longitudinally adjustable therein transversely to the rail.

11. A rail fastening comprising a two-part rail clamp, combined with a rail support slotted transversely to the rail and having clutch faces on both the inner sides of the slot, the two parts of the rail clamp having clutch faces interlocking with both the clutch faces of the slot and vertically adjustable therein transversely to the rail.

12. A rail fastening comprising a two-part rail clamp, combined with a rail support slotted transversely to the rail and having clutch faces on both the inner sides of the slot, the two parts of the rail clamp having clutch faces interlocking with both the clutch faces of the slot and longitudinally and vertically adjustable therein transversely to the rail, the rail support being formed in two separable parts fastened together.

13. A rail fastening comprising a two-part rail clamp, combined with a rail support slotted transversely to the rail and having clutch faces on both the inner sides of the slot, the two parts of the rail clamp having clutch faces interlocking with both the clutch faces of the slot and longitudinally adjustable therein transversely to the rail, the rail support being formed into separable parts fastened together, and one of the clamp sections being formed with an underlapping lug housed within the joint of the two-part rail support.

14. A rail fastening, comprising a rail support having an opening running transversely to the rail with horizontal clutch formations on one side of the opening and vertical clutch formations on the other side of the opening, and a compound rail clamp composed of two interlocking members, one having vertical clutch formations on its outer side and the other having horizontal clutch formations on the outer side.

15. A rail fastening comprising a two-part rail clamp, combined with a rail support slotted transversely to the rail and having clutch faces on both the inner sides of the slot, the two parts of the rail clamp having clutch faces interlocking with the clutch faces of the slot and longitudinally and vertically adjustable therein transversely to the rail, the rail support being formed in two separable parts fastened together, and a railroad tie arranged beneath the two part rail support, and a fastening for securing the two parts of the rail support to each other and also to the subjacent tie or roadbed.

16. A rail fastening comprising a two-part rail clamp, combined with a rail support slotted transversely to the rail and having clutch faces on both the inner faces of the slot, the two parts of the rail clamp having clutch faces interlocking with the clutch faces of the slot and longitudinally and vertically adjustable therein transversely to the rail, the clutch faces of the two members of the two-part clamp having a slidable conformation at right angles to each other and the clutch faces on both sides of the opening in the rail support being exactly alike.

17. A rail fastening comprising a two-part rail clamp combined with a rail support slotted transversely to the rail and having similar clutch faces on both sides of the slot, each with interlocking grooves at right angles, one of the rail clamp members having vertical clutch formations on both of its parallel sides interlocking with the clutch formations on both sides of the slot, and the other rail clamp member having horizontal clutch formations on one side interlocking with the clutch formations on one side of the slot only, and means for locking the two clamp members together.

18. A rail fastening comprising a rail support having an opening running transversely to the rail with clutch formations on both the opposite faces of said opening, one set of clutch formations being horizontal and the other vertical, and a rail clamp, one side face of the same bearing against and intermeshing and interlocking with the face of the slot opening having clutch formations running in a horizontal direction, and the other side face of the said clamp bearing against and locking and intermeshing with the other face of the slot opening having clutch formations running in a vertical direction, said rail clamp having an overhanging lug overlapping the base of the rail.

19. A rail fastening comprising a rail support having an opening running transversely to the rail with clutch formations on both the opposite faces of the said opening, one set of clutch formations being horizontal and the other vertical, and a rail clamp, one side face of the same bearing against and intermeshing and interlocking with the face of the slot opening having clutch formations running in a horizontal direction, and the other side face of the said clamp bearing against and interlocking and intermeshing with the other face of the slot opening, having clutch formations running in a vertical direction, said rail clamp having an overhanging lug overlapping the base of the rail, and means for adjusting and locking the faces of the said slot opening against the faces of the said clamp.

20. A rail fastening comprising a clamp, with opposite clutch faces, combined with a rail support slotted transversely to the rail, said slot being formed by two separate rail-supporting sections connected together, and having clutch faces on both the inner faces of said slot, the rail clamp having clutch faces interlocking and intermeshing with the clutch faces of the slot and longitudinally and vertically adjustable therein transversely to the rail.

21. A rail fastening comprising a rail clamp, combined with a rail support slotted transversely to the rail, and having clutch faces on both the inner faces of the said slot, the rail clamp having clutch faces interlocking and intermeshing with the clutch faces of the slot and longitudinally and vertically adjustable therein transversely to the rail, the rail support being formed in two parts separable from each other and bolted together.

22. A rail fastening, comprising a rail support having an opening running transversely to the rail with horizontal clutch formations on one side of the opening, and vertical clutch formations on the other side of the opening, and a rail clamp, one side face of the said rail clamp having vertical clutch formations, and the other side of the face of said clamp having horizontal clutch formations, each matching and interlocking with and intermeshing with their respective sides of the clutch faces of the slot opening next to the same.

23. A rail fastening comprising a rail clamp having opposite clutch faces, combined with a rail support slotted transversely to the rail and having clutch faces on both the inner faces of the slot, the two side faces of the said rail clamp having clutch faces interlocking with the clutch faces of the slot and longitudinally and vertically adjustable therein transversely to the rail, the rail support being formed in two separable parts fastened together, and a railroad tie arranged beneath the two-part rail support, and means for securing the two parts of the rail support to each other and also to the subjacent tie or roadbed.

24. A rail fastening comprising a rail clamp, having opposite clutch faces combined with a rail support slotted transversely to the rail and having clutch faces on both the inner faces of the slot, the rail clamp having its clutch faces interlocking and intermeshing with the clutch faces of the slot and longitudinally and vertically adjustable therein transversely to the rail, and the clutch faces of the two sides respectively of the rail clamp having inserting conformations at right angles to each other, and the clutch faces on both sides of the slot opening in the rail support being exactly alike.

Subscribed and sworn to this fifth day of November, A. D., 1907.

OLIVER A. HALL.

Witnesses:
EMILE W. HICKOK,
WILLIAM ARTHUR.